(12) United States Patent
Jang

(10) Patent No.: US 7,712,711 B2
(45) Date of Patent: May 11, 2010

(54) DISPLAY APPARATUS

(75) Inventor: Se-ki Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 194 days.

(21) Appl. No.: 11/144,756

(22) Filed: Jun. 6, 2005

(65) Prior Publication Data

US 2006/0011788 A1    Jan. 19, 2006

(30) Foreign Application Priority Data

Jun. 15, 2004    (KR) .................. 10-2004-0044095

(51) Int. Cl.
A47F 5/00     (2006.01)
A47F 7/00     (2006.01)
F16M 11/00    (2006.01)
F16M 13/00    (2006.01)

(52) U.S. Cl. .................. 248/125.8; 248/371; 248/415; 248/349.1; 248/917; 248/919; 361/679.21

(58) Field of Classification Search .................. 248/371, 248/415, 349.1, 917, 919, 125.8, 188.5, 416
See application file for complete search history.

(56) References Cited

U.S. PATENT DOCUMENTS

| | | |
|---|---|---|
| 2,890,010 A | 6/1959 | Barkheimer |
| 4,365,561 A | 12/1982 | Tellier et al. |
| 4,395,010 A | 7/1983 | Helgeland et al. |
| 4,552,418 A | 11/1985 | Sarnezki et al. |
| 4,605,188 A | 8/1986 | Goetz |
| 4,611,777 A | 9/1986 | Ireland et al. |
| 4,616,218 A | 10/1986 | Bailey et al. |
| 4,684,089 A | 8/1987 | van der Lely |
| 4,690,362 A | 9/1987 | Helgeland |
| 4,733,838 A | 3/1988 | van der Lely |

(Continued)

FOREIGN PATENT DOCUMENTS

JP    61-99873    6/1986

(Continued)

OTHER PUBLICATIONS

International Search Report issued on Sep. 7, 2005, for PCT/KR2005/001598.

*Primary Examiner*—J. Allen Shriver, II
*Assistant Examiner*—Michael McDuffie
(74) *Attorney, Agent, or Firm*—Stanzione & Kim, LLP

(57) ABSTRACT

A display apparatus including a display main body to display a picture thereon, a base to support the display main body on an installation surface, and a lifting unit provided between the display main body and the base to move the display main body up and down relative to the base, the lifting unit having a guide frame vertically disposed relative to the base, a lifting member slideably provided in the guide frame and coupled to the display main body, and an oil groove formed in at least one of the guide frame and the lifting member. With this configuration, the present general inventive concept provides a display apparatus in which a display main body can lift up and down relative to a base. The present general inventive concept also provides a display apparatus in which a display main body can rotate in various directions relative to a base.

25 Claims, 14 Drawing Sheets

U.S. PATENT DOCUMENTS

| | | | |
|---|---|---|---|
| 4,964,606 A * | 10/1990 | Beam et al. | 248/333 |
| 5,114,109 A | 5/1992 | Fitz et al. | |
| 5,124,805 A | 6/1992 | Chung et al. | |
| 5,128,662 A | 7/1992 | Failla | |
| 5,179,447 A | 1/1993 | Lain | |
| 5,197,704 A * | 3/1993 | Kitamura | 248/292.11 |
| 5,229,920 A | 7/1993 | Spaniol et al. | |
| 5,279,488 A | 1/1994 | Fleming | |
| 5,283,595 A | 2/1994 | Krukovsky | |
| 5,354,028 A * | 10/1994 | Kitamura | 248/292.11 |
| 5,373,333 A | 12/1994 | Kawada et al. | |
| 5,657,958 A * | 8/1997 | McLaughlin et al. | 248/632 |
| 5,729,429 A | 3/1998 | Margaritis et al. | |
| 5,831,696 A * | 11/1998 | Sheng | 349/58 |
| 6,064,373 A | 5/2000 | Ditzik | |
| 6,145,797 A * | 11/2000 | Uehara | 248/291.1 |
| 6,189,842 B1 * | 2/2001 | Bergeron Gull et al. | 248/125.1 |
| 6,189,850 B1 * | 2/2001 | Liao et al. | 248/292.14 |
| 6,326,955 B1 | 12/2001 | Ditzik | |
| 6,378,830 B1 * | 4/2002 | Lu | 248/278.1 |
| 6,431,157 B1 * | 8/2002 | Marcil | 123/568.11 |
| 6,478,003 B2 * | 11/2002 | Laimbock | 123/193.6 |
| 6,532,628 B2 * | 3/2003 | Kim | 16/342 |
| 6,712,321 B1 * | 3/2004 | Su et al. | 248/123.11 |
| 6,769,657 B1 * | 8/2004 | Huang | 248/278.1 |
| 6,783,105 B2 * | 8/2004 | Oddsen, Jr. | 248/279.1 |
| 6,857,610 B1 * | 2/2005 | Conner et al. | 248/284.1 |
| 6,918,564 B2 * | 7/2005 | Yen et al. | 248/404 |
| 6,921,057 B2 * | 7/2005 | Chen et al. | 248/349.1 |
| 7,014,154 B2 * | 3/2006 | Jeong et al. | 248/157 |
| 7,168,665 B2 * | 1/2007 | Hong et al. | 248/125.1 |
| 2001/0017761 A1 | 8/2001 | Ditzik | |
| 2003/0075649 A1 * | 4/2003 | Jeong et al. | 248/157 |
| 2003/0080949 A1 | 5/2003 | Ditzik | |
| 2004/0011932 A1 * | 1/2004 | Duff | 248/157 |
| 2004/0056161 A1 * | 3/2004 | Ishizaki et al. | 248/176.3 |

FOREIGN PATENT DOCUMENTS

| | | |
|---|---|---|
| JP | 61-99874 | 6/1986 |
| JP | 61-196314 | 8/1986 |
| JP | 62-96681 | 6/1987 |
| JP | 62-96682 | 6/1987 |
| JP | 62-239677 | 10/1987 |
| JP | 2-58783 | 4/1990 |
| JP | 02-215408 | 8/1990 |
| JP | 03-2381 | 1/1991 |
| JP | 03-29800 | 3/1991 |
| JP | 03-113423 | 11/1991 |
| JP | 03-114875 | 11/1991 |
| JP | 04-33073 | 3/1992 |
| JP | 04-81182 | 7/1992 |
| JP | 05-36423 | 5/1993 |
| JP | 5-188865 | 7/1993 |
| JP | 05-66715 | 9/1993 |
| JP | 6-4778 | 1/1994 |
| JP | 6-1188880 | 4/1994 |
| JP | 10-312157 | 11/1998 |
| JP | 2003-302915 | 10/2003 |
| KR | 10-0234420 | 12/1999 |
| KR | 10-0266782 | 9/2000 |
| KR | 20-0224023 | 5/2001 |

* cited by examiner

//DISPLAY APPARATUS

CROSS-REFERENCE TO RELATED APPLICATIONS

This application claims the benefit of Korean Patent Application No. 2004-44095, filed on Jun. 15, 2004, in the Korean Intellectual Property Office, the disclosure of which is incorporated herein by reference.

BACKGROUND OF THE INVENTION

1. Field of the Invention

The present general inventive concept relates to a display apparatus, and more particularly, to a display apparatus having an improved structure of relative operations between a display main body and a base.

2. Description of the Related Art

Generally, a display apparatus comprises a display main body to display a picture thereon, and a base seated on an installation surface, such as a table, to support the display main body.

Recently, a flat panel display, such as a liquid crystal display (LCD) or a plasma display panel (PDP), has been employed as a display main body.

FIG. 1 is a perspective view of a conventional display apparatus. As shown therein, the conventional display apparatus 101 comprises a base 120 seated on an installation surface, such as a table, a display main body 110 supported by the base 120 to display a picture thereon, and a tilting hinge 130 provided between the base 120 and the display main body 110 to allow the display main body 110 to be tilted about the base 120.

The tilting hinge 130 comprises a pair of brackets 131 coupled to a back of the display main body 110, and a pair of hinge shafts 133 having a first end coupled to each bracket 131 and a second end coupled to an upper portion of the base 120.

The hinge shafts 133 are aligned along a right and left direction with respect to the display main body 110 to rotatably connect the brackets 131 and the upper portion of the base 120. Thus, the display main body 110 can be tilted with respect to the hinge shaft 133 (refer to an arrow "A" in FIG. 1).

However, in the conventional display apparatus 101, the display main body 101 cannot lift up and down relative to the base 120, causing an inconvenience for a user.

Additionally, in this conventional display apparatus 101, the display main body 101 cannot swivel and pivot relative to the base 120, wherein the swiveling refers to rotation with respect to a vertical direction of the base and the pivoting refers to rotation with respect to a frontward and backward direction of the base.

As described above, if the display apparatus could lift up and down relative to the base, and swivel and pivot relative to the base, it would be more convenient for a user to use.

SUMMARY OF THE INVENTION

Accordingly, the present general inventive concept provides a display apparatus in which a display main body can lift up and down relative to a base.

The present general inventive concept also provides a display apparatus in which a display main body can rotate in various directions relative to a base.

Additional aspects and advantages of the present general inventive concept will be set forth in part in the description which follows and, in part, will be obvious from the description, or may be learned by practice of the general inventive concept.

The foregoing and/or other aspects and advantages of the present general inventive concept are achieved by providing a display apparatus comprising a display main body to display a picture thereon, a base to support the display main body on an installation surface, and a lifting unit provided between the display main body and the base to allow the display main body to move up and down relative to the base, the lifting unit comprising a guide frame vertically disposed relative to the base, a lifting member slidably provided in the guide frame and coupled to the display main body, and an oil groove formed in at least one of the guide frame and the lifting member.

The lifting unit may further comprise a guide member provided in the guide frame to guide the lifting member to slide.

The oil groove may be formed transversely to a sliding direction of the lifting member to be in contact with the guide member.

The lifting unit may also comprise at least one elastic member provided between the guide frame and the lifting member to elastically bias the lifting member upward relative to the guide frame.

The elastic member may comprise a spiral spring having a first end coupled to a plate portion of the guide frame and a second end coupled to a spring shaft, and the lifting member may be formed with a shaft coupling portion to which the spring shaft is coupled.

A shaft supporter may be provided between the spring shaft and the spiral spring and formed with a shaft accommodating portion to accommodate and rotatably support the spring shaft therein, and a friction member may be provided between the shaft supporter and the spring shaft to generate rotational friction in the spring shaft.

The lifting unit may further comprise a stopper coupling the lifting member with the guide frame to allow the lifting member to stop in the guide frame.

The lifting unit may also comprise a lifting restricting part to restrict a slidable distance of the lifting member relative to the guide frame.

The lifting restricting part may comprise a sliding slot vertically formed in the guide frame, and a sliding projection having a first end coupled to the lifting member and a second end inserted in the sliding slot to restrict a slidable distance of the sliding projection within the sliding slot.

The display apparatus may further comprise a tilting unit provided between the display main body and the lifting unit to allow the display main body to tilt about the base.

The tilting unit may comprise a first tilting bracket coupled to the lifting unit, a second tilting bracket coupled to the display main body, and a tilting shaft provided between the first and second tilting brackets and allowing the second tilting bracket to be tilted about the first tilting bracket.

The tilting unit may also comprise a spring coupled to both the first and second tilting brackets.

The display apparatus may further comprise a pivoting unit provided between the display main body and the tilting unit to allow the display main body to pivot about the base.

The pivoting unit may comprise a pivoting shaft coupled to the tilting unit and a pivoting bracket having a first side coupled to the display main body and a second side pivotally coupled to the pivoting shaft.

The pivoting unit may further comprise a pivoting angle restricting part to restrict a pivotable angle of the pivoting bracket relative to the tilting unit.

The display apparatus may further comprise a swiveling unit swivelably coupled to the base to allow the display main body to swivel about the installation surface.

The swiveling unit may comprise a swiveling member coupled to the base; and a swiveling supporter having a first side supported on the installation surface and a second side swivelably contacting the swiveling member and supporting the swiveling member and the base to swivel with respect to each other.

BRIEF DESCRIPTION OF THE DRAWINGS

The above and/or other aspects and advantages of the present general inventive concept will become apparent and more readily appreciated from the following description of the embodiments, taken in conjunction with the accompany drawings of which.

DETAILED DESCRIPTION OF THE PREFERRED EMBODIMENTS

Figure 1:
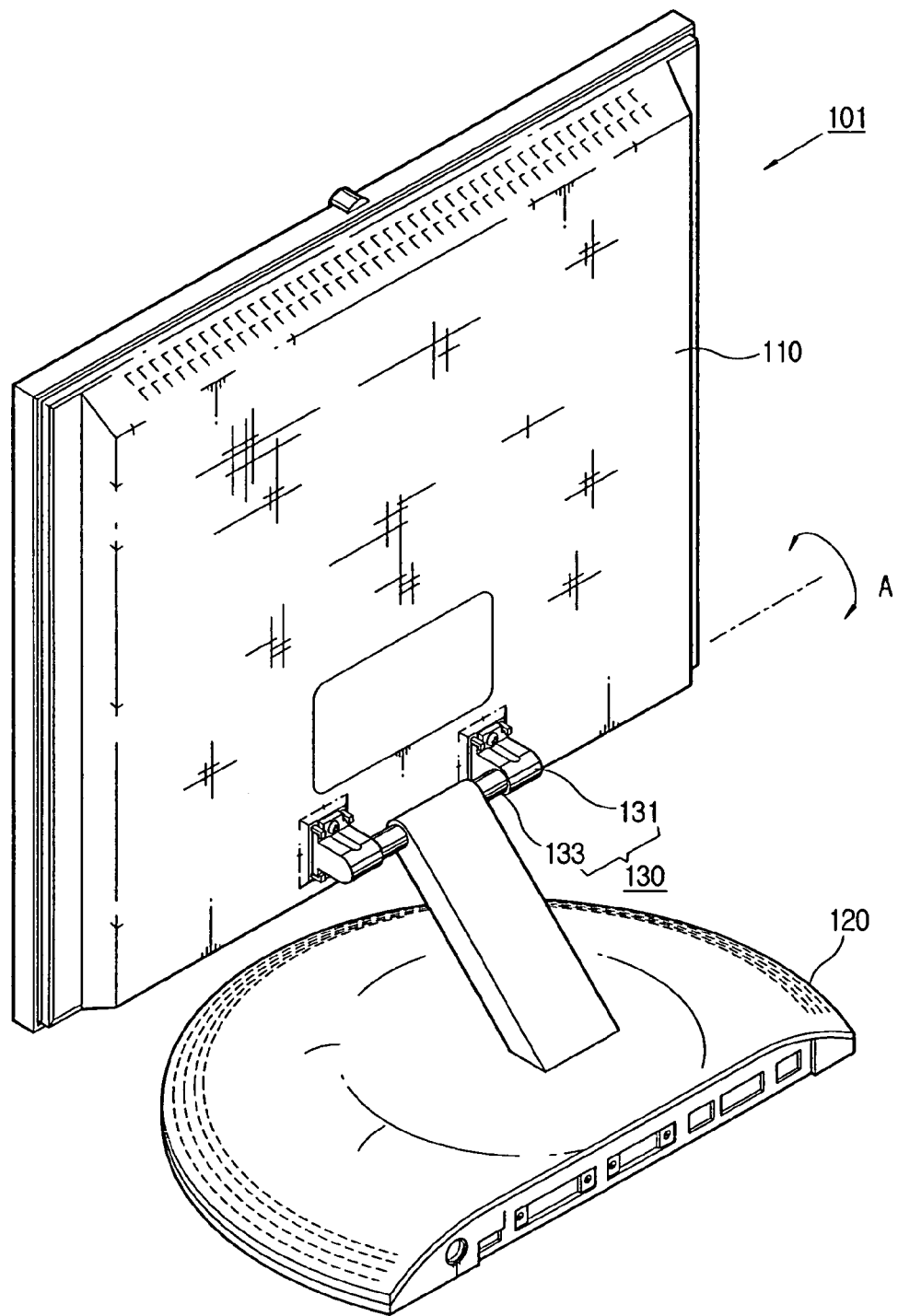
FIG. 1 is a rear perspective view of a conventional display apparatus.

Reference will now be made in detail to the embodiments of the present general inventive concept, examples of which are illustrated in the accompanying drawings, wherein like reference numerals refer to like elements throughout. The embodiments are described below in order to explain the present general inventive concept while referring to the figures.

As shown in FIGS. 2-7, and 14, a display apparatus 1 according to an embodiment of the present general inventive concept may comprise a display main body 10 to display a picture thereon, a base 20 to support the display main body 10 against a predetermined installation surface, and a lifting unit 60 provided between the display main body 10 and the base 20 to lift the display main body 10 up and down relative to the base 20. Further, the display apparatus 1 may comprise a tilting unit 30 provided between the display main body 10 and the lifting unit 60 to allow the display main body 10 to tilt about the base 20. Also, the display apparatus 1 may comprise a pivoting unit 40 provided between the display main body 10 and the tilting unit 30 to allow the display main body 10 to pivot with respect to the base 20 (see, for example, FIG. 3). The display apparatus 1 may further comprise a swiveling unit 90 swivelably coupled to the base 20 to allow the display main body 10 to be swiveled about the installation surface (see, for example, FIG. 7).

The display main body 10 may comprise a flat panel display 11, such as an LCD or a PDP, and display the picture thereon. However, the display main body 10 may comprise other various displays, such as a cathode ray tube (CRT) or the like, as well. On a back portion of the display main body 10 can be formed a plurality of coupling holes (not shown) to be coupled with projections 42a and fastening holes 42b of a pivoting bracket 41 (to be described later with reference to FIG. 5) by screws (not shown). Here, the fastening holes 42b of the pivoting bracket 41 and the coupling holes of the display main body 10 can be formed on the basis of a VESA (video electronic standard association) standard. In this case, an arm stand (not shown) based on the VESA standard can be coupled to the coupling hole of the display main body 10.

The base 20 can be shaped like a plate to sit on the installation surface, such as a table. The base 20 can be coupled to a guide frame 61 of the lifting unit 60 (to be described later) to support the lifting unit 60, etc (see, for example, FIG. 3). The base 20 may comprise a base frame 25 coupled to the guide frame 61, and a base cover 21 provided on the base frame 25 (see FIG. 7). The installation surface, on which the base 20 sits, may include a horizontal surface, but may also include an inclined surface, such as a wall.

The base frame 25 can be shaped like a plate and made of a metal having a sufficient solidity, but may also be made of other materials, such as plastics.

The base cover 21 may be made by molding plastics, but may also be made of various materials, such as aluminum, to beautify an outer appearance thereof. The base cover 21 can be coupled to the base frame 25 by a screw (not shown) or the like.

Figure 2:
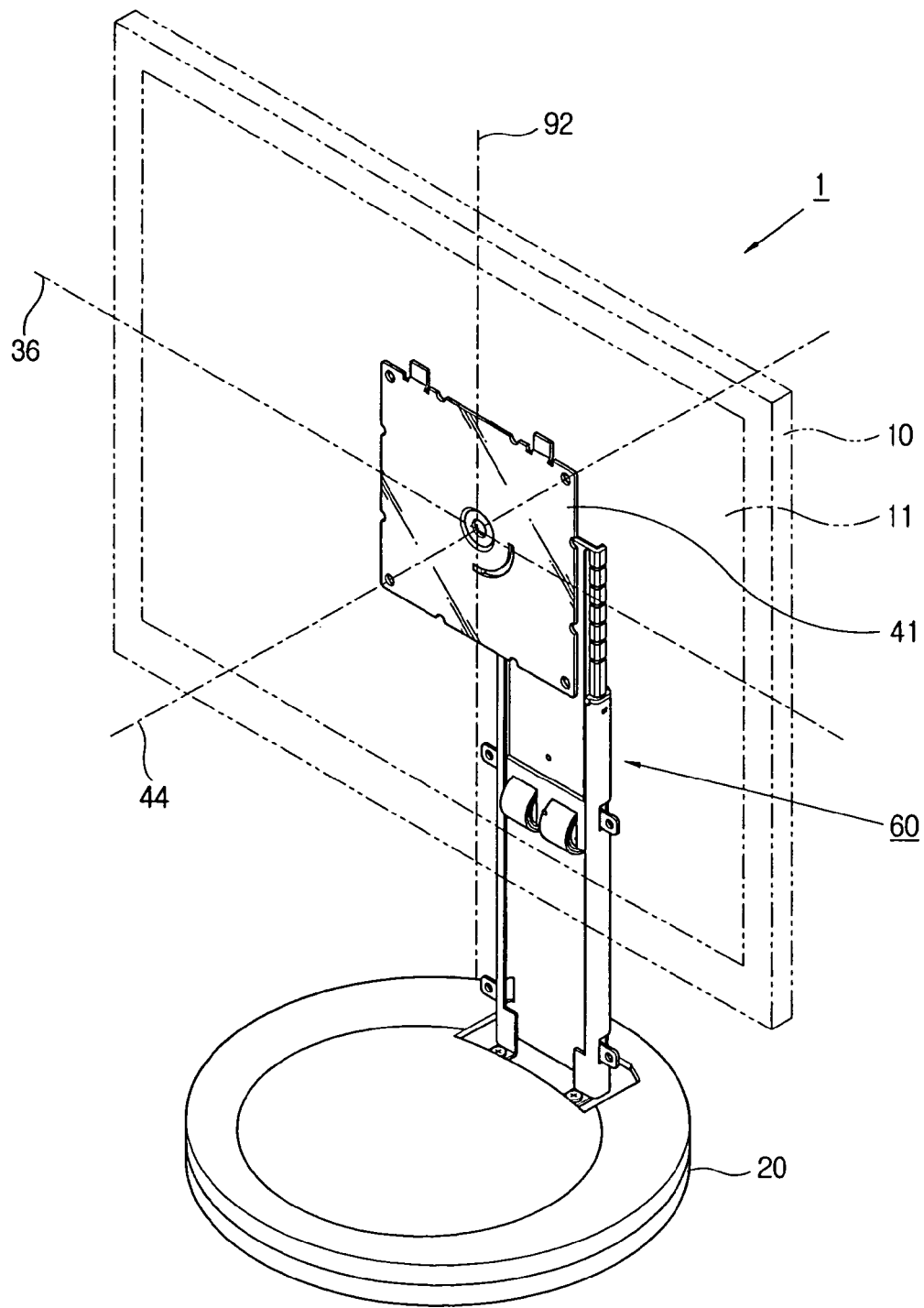
FIG. 2 is a perspective view of a display apparatus according to an embodiment of the present general inventive concept.
Figure 3:
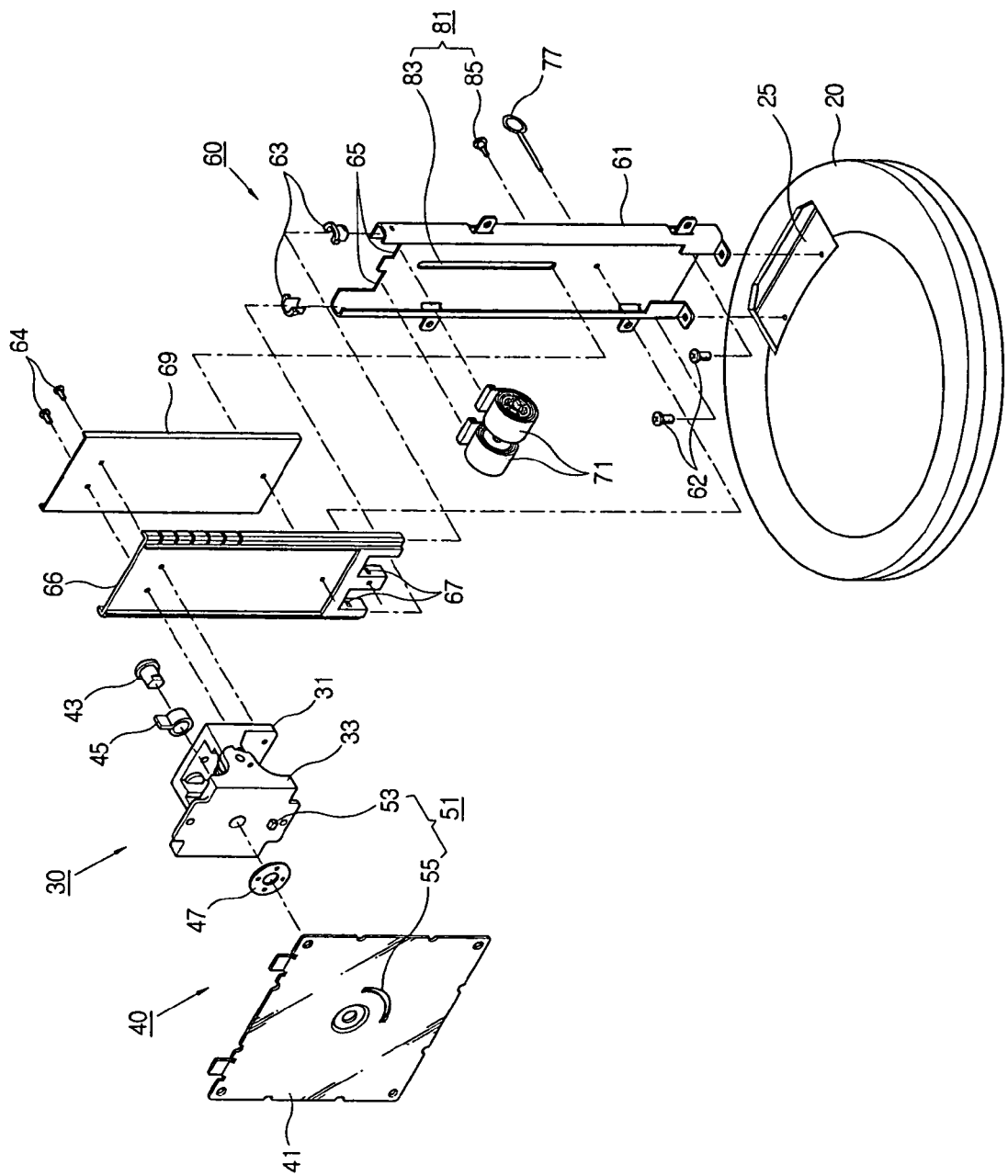
FIG. 3 is an exploded perspective view of the display apparatus of FIG. 2.
Figure 4:
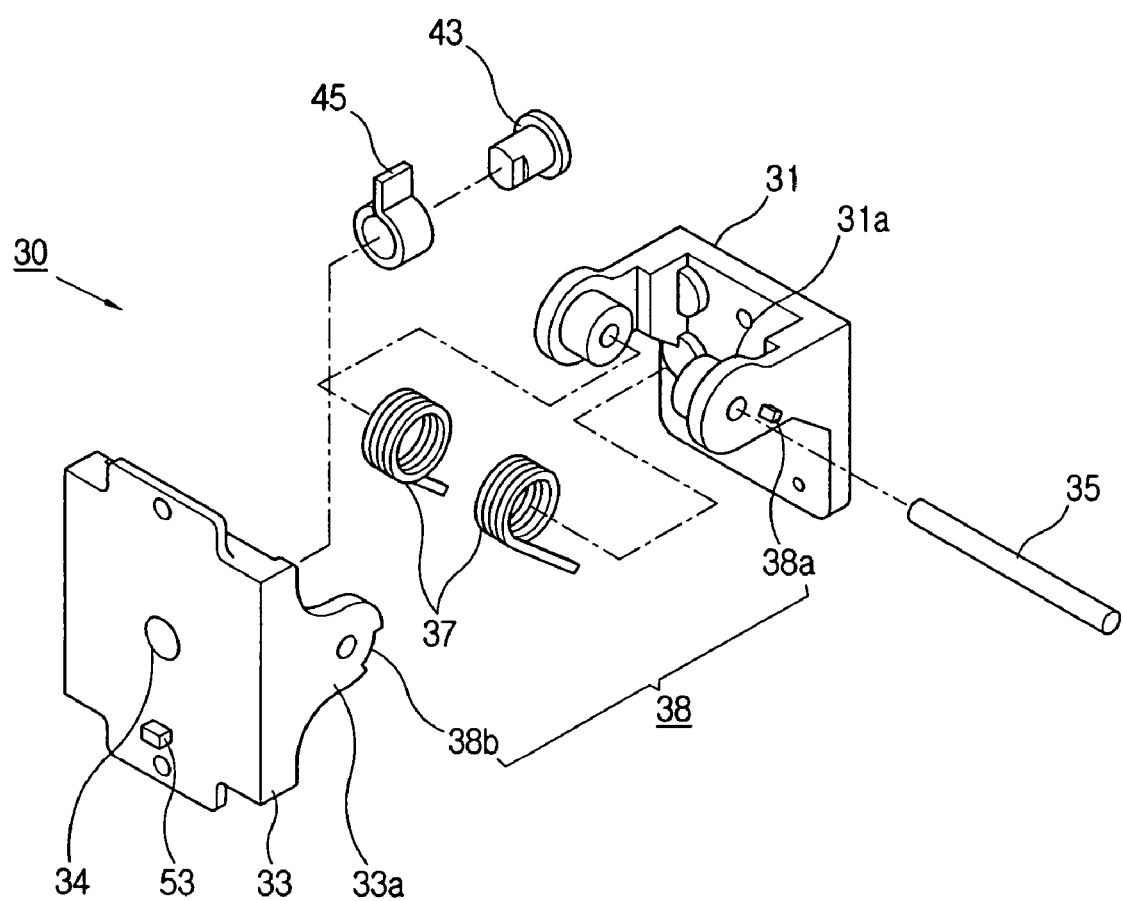
FIG. 4 is an exploded perspective view of a tilting unit provided in the display apparatus of FIG. 3.

The tilting unit 30, as shown in FIGS. 3 and 4 for example, can be provided between the lifting unit 60 and the pivoting unit 40 and allows the display main body 10 to be tilted with respect to a right and left direction axis 36 (FIG. 2) relative to the base 20. The tilting unit 30 may comprise a first tilting bracket 31 coupled to the lifting unit 60, a second tilting bracket 33 coupled to the display main body 10, and a tilting shaft 35 coupled to both the first and second tilting brackets 31 and 33 to allow the second tilting bracket 33 to tilt about the first tilting bracket 31. Further, the tilting unit 30 may comprise a spring 37 coupled to both the first and second tilting brackets 31 and 33. Further, the tilting unit 30 may comprise a tilting angle restricting part 38 provided in both the first and second tilting brackets 31 and 33 to restrict a tiltable angle of the second tilting bracket 33.

The first tilting bracket 31 can be shaped like a plate and coupled to a lifting member 66 of the lifting unit 60 to slide together with the lifting member 66. The first tilting bracket 31 may comprise a first tilting shaft coupling portion 31a protruding from a surface thereof toward the second tilting bracket 33 to couple with the tilting shaft 35.

The second tilting bracket 33 can be shaped like a plate and provided with a first pivoting shaft coupling portion 34 to be coupled with a pivoting shaft 43 of the pivoting unit 40 (to be described later). The second tilting bracket 33 may comprise a second tilting shaft coupling portion 33a protruding from a surface thereof toward the first tilting bracket 31 to couple with the tilting shaft 35.

The tilting shaft 35 inserts into both the first tilting shaft coupling portion 31a of the first tilting bracket 31 and the second tilting shaft coupling portion 33a of the second tilting bracket 33, thereby allowing the second tilting bracket 33 to tilt about the first tilting bracket 31. The tilting shaft 35 may be fitted into both the first and second tilting shaft coupling portions 31a and 33a so as to generate friction when the second tilting bracket tilts about the first tilting bracket 31. Preferably, the friction is at a strength so as to be easily overcome by a user.

The spring 37 may be a torsion coil spring having a first end coupled to the first tilting bracket 31 and a second end coupled to the second tilting bracket 33. Such a torsion coil spring 37 can elastically urge the second tilting bracket 33 frontward relative to the first tilting bracket 31. That is, the torsion coil spring 37 can prevent the second tilting bracket 33, coupled to the display main body 10, from being tilted backward due to a weight of the display main body 10. Preferably, the torsion coil spring 37 has a strong enough elasticity to prevent the second tilting bracket 33 from being tilted backward due to the weight of the display main body 10. Thus, the elasticity of the torsion coil spring 37 can allow the user not only to easily tilt the display main body 10 frontward regardless of the weight of the display main body 10, but also to tilt the display main body 10 with an approximately equal force regardless of a frontward or backward direction.

The tilting angle restricting part 38 may comprise a tilting projection 38a provided in one of the first tilting shaft coupling portion 31a of the first tilting bracket 31 and the second tilting shaft coupling portion 33a of the second tilting bracket 33, and a tilting projection accommodating part 38b provided in the other one thereof to accommodate the tilting projection 38a within a predetermined movable range.

The tilting projection 38a can protrude from a surface of the first tilting shaft coupling portion 31a in a direction parallel with the tilting shaft 35. The tilting projection accommodating part 38b can be formed by cutting out of the second tilting shaft coupling portion 33a an arc shape of the tiltable angle, to thereby accommodate the tilting projection 38a therein and to restrict the movable range of the tilting projection 38a.

Figure 5:
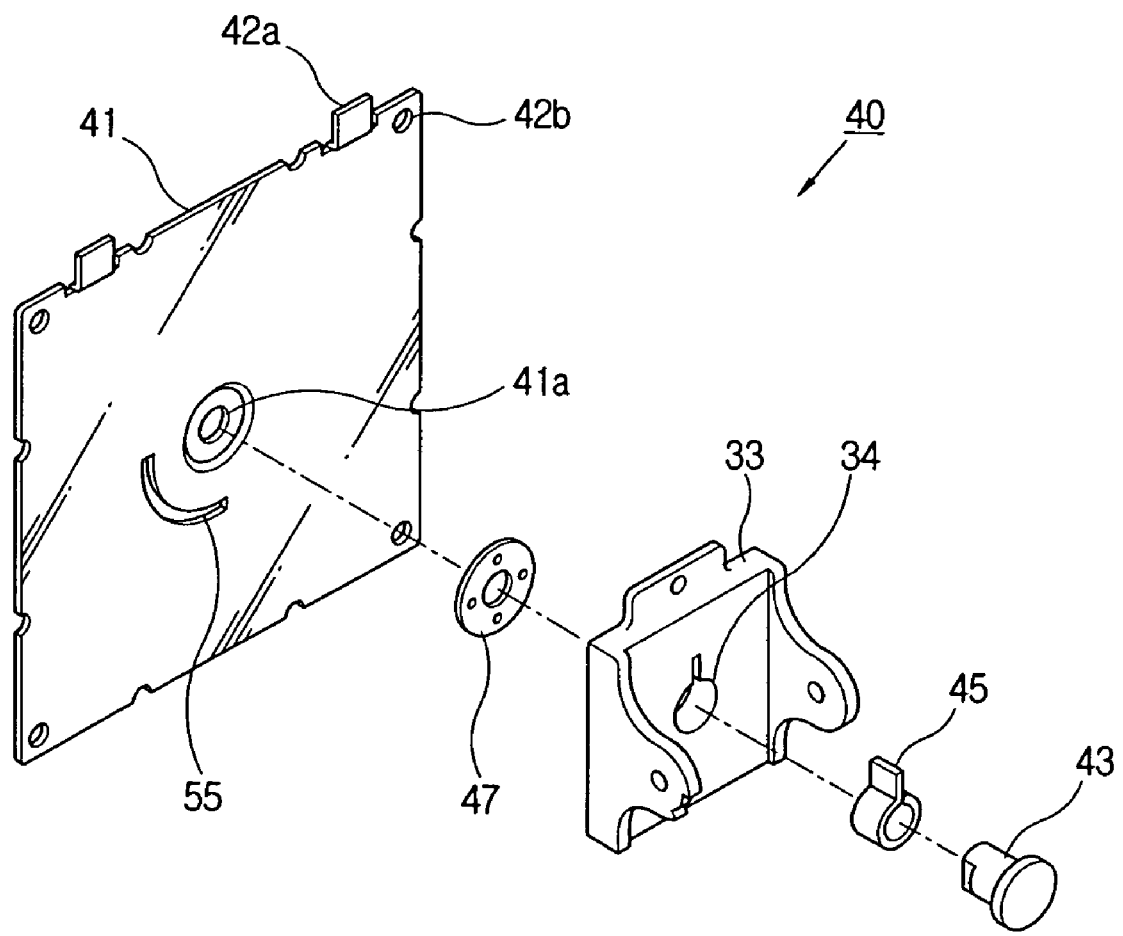
FIG. 5 is an exploded perspective view of a pivoting unit provided in the display apparatus of FIG. 3.

The pivoting unit 40 as shown in FIGS. 3 and 5, can be provided between the display main body 10 and the tilting unit 30 to allow the display main body 10 to be pivoted with respect to a frontward and backward direction axis 44 relative to the base 20 (refer to FIG. 2). Further, the pivoting unit 40 may comprise the pivoting shaft 43 coupled to the tilting unit 30, and the pivoting bracket 41 having a first side coupled to the display main body 10 and a second side pivotally coupled to the pivoting shaft 43. Further, the pivoting unit 40 may comprise a pivoting angle restricting part 51 to restrict a pivotable angle of the pivoting bracket 41 relative to the tilting unit 30.

The pivoting shaft 43 can have a first end inserted in and coupled with the first pivoting shaft coupling portion 34 provided in the second tilting bracket 33 of the tilting unit 30, and a second end pivotally coupled with the pivoting bracket 41. That is, the pivoting shaft 43 can have the first end coupled with the first pivoting shaft coupling portion 34, which penetrates the second tilting bracket 33 of the tilting unit 30, and the second end inserted in a second pivoting shaft coupling portion 41a, which penetrates the pivoting bracket 41. The first end of the pivoting shaft 43 can have a diameter larger than that of a middle portion of the pivoting shaft 43. The second end of the pivoting shaft 43 passes through the second pivoting shaft coupling portion 41a and can then be bent outwardly. Further, the pivoting unit 40 may comprise at least one washer 47 put on the pivoting shaft 43 and interposed between the second tilting bracket 33 and the pivoting bracket 41. Further, a pivoting curling 45 can be provided between the pivoting shaft 43 and the first pivoting shaft coupling portion 34. The pivoting curling 45 can be non-pivotally inserted in the first pivoting shaft coupling portion 34 and the pivoting shaft 43 can be fitted thereto, to thereby generate a rotational friction when the pivoting shaft 43 pivots.

There may be provided four washers 47. However, there also may be provided three or less washers 47 or five or more washers 47. The washers 47 provide elasticity to generate rotational friction between the second tilting bracket 33 and the pivoting bracket 41 when the pivoting bracket 41 pivots about the second tilting bracket 33. The washers 47 may include a disc spring to provide elasticity between the second tilting bracket 33 and the pivoting bracket 41, but also may include various other elastic bodies. The rotational friction due to the washer 47 is preferably at a strength so as to be easily overcome by the user when the user pivots the display main body 10 relative to the base 20.

The pivoting bracket 41 can be shaped like a plate and formed with the second pivoting shaft coupling portion 41a in the center thereof. The pivoting bracket 41 can be provided with the plurality of projections 42a and the plurality of fastening holes 42b so as to be coupled with the back of the display main body 10.

The projections 42a can protrude as a pair of projections from an upper portion of the pivoting bracket 41 in a direction of the display main body 10, so that the projections 42a can be inserted in and coupled to the back of the display main body 10. There may be provided four of the fastening holes 42b, and the fastening holes 42b can be coupled to the coupling holes (not shown) formed in the back of the display main body 10 by screws (not shown).

The pivoting angle restricting part 51 restricts the pivotable angle of the pivoting bracket 41 coupled to the display main body 10 relative to the second tilting bracket 33. The pivoting angle restricting part 51 may comprise a projection stopper 53 protruding from the second tilting bracket 33 toward the pivoting bracket 41, and a pivoting slot 55 formed in the pivoting bracket 41 to accommodate the projection stopper 53 therein.

The pivoting slot 55 can be formed as an arc shape in a pivoting bracket 41. The arc shaped pivoting slot 55 may have a central angle of 90 degrees to thereby allow the display main body 10 to pivot within the pivotable angles of 0~90 degrees. However, the arc shaped pivoting slot may have an central angle of 180 degrees so as to allow the display main body to pivot within the pivotable angles of 0~180 degrees. Here, the pivotable angle may vary as necessary. Thus, the display main body 10 can be tilted about the base 20 within the predetermined pivotable angle.

Figure 6:
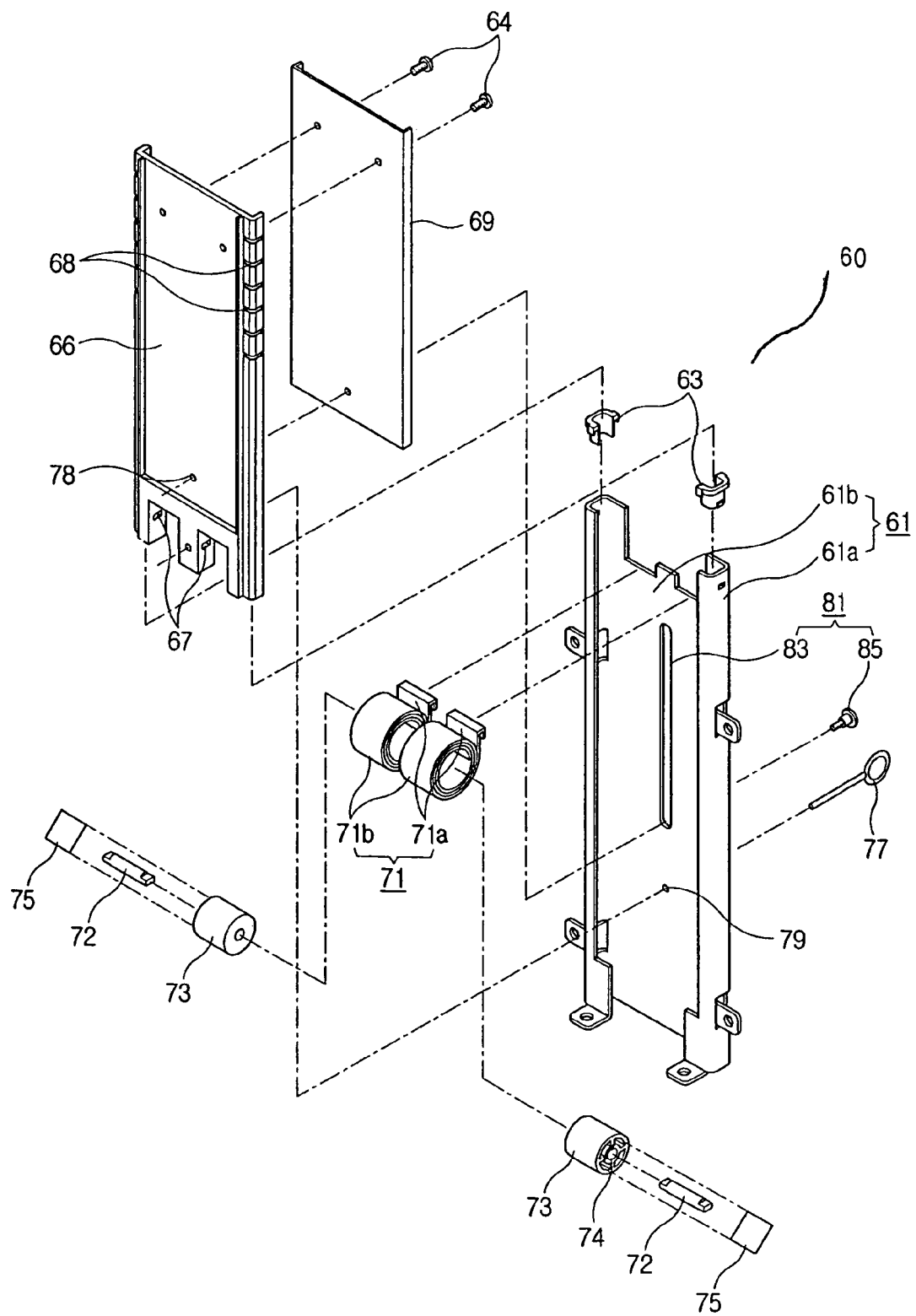
FIG. 6 is an exploded perspective view of a lifting unit provided in the display apparatus of FIG. 3.

The lifting unit 60, as shown in FIGS. 2-3 and 6, can be provided between the base 20 and the tilting unit 30 to slide the display main body 10 up and down (with respect to the display apparatus 1 shown in FIG. 2) relative to the base 20. The lifting unit 60 may comprise the guide frame 61 vertically disposed relative to the base 20, and the lifting member 66 slidably provided in the guide frame 61 and coupled to the display main body 10. Further, the lifting unit 60 may comprise oil groves 68 formed in at least one of the guide frame 61 and the lifting member 66. Further, the lifting unit 60 may comprise a guide member 63 provided in the guide frame 61 to guide the lifting member 66 to slide. Further, the lifting unit 60 may comprise an elastic member 71 provided between the guide frame 61 and the lifting member 66 to elastically urge the lifting member 66 upward relative to the guide frame 61. Further, the lifting unit 60 may comprise a stopper 77 to couple the lifting member 66 with the guide frame 61, to thereby allow the lifting member 66 to stop in the guide frame 61. Further, the lifting unit 60 may comprise a lifting restricting part 81 to restrict a slidable distance of the lifting member 66 relative to the guide frame 61.

The guide frame 61 can be vertically coupled to the base frame 62 by a screw 25. The guide frame 61 may comprise a pair of guiding portions 61a provided at opposite sides thereof and having a "⊐"-shape to support opposite sides of the lifting member 66, and a plate portion 61*b* to connect the pair of guiding portions 61*a* with each other. The guide frame 61 may be made of a metal to have a sufficient solidity, but may be made of various materials, such as plastics, as well.

The elastic member 71 may comprise a spiral spring having a first end 71*a* coupled to the plate portion 61*b* of the guide frame 61 and a second end 71*b* rolled with respect to a spring shaft 72. The elastic member 71 may be provided as a pair of elastic members. However, there may be provided one elastic member 71 or three or more elastic members 71 as well. Further, the elastic member 71 may comprise a coil spring, a flat spring or an elastic body such as rubber, or the like.

The first end 71*a* of the spiral spring 71 can be bent and coupled to the plate portion 61*b* of the guide frame 61 by an elastic member accommodator 65 formed in the guide frame 61. The second end 71*b* of the spiral spring 71 can be rolled with respect to the spring shaft 72.

Opposite ends of the spring shaft 72 can be coupled to a shaft coupling portion 67 of the lifting unit 66. Further, a shaft supporter 73 can be provided between the spring shaft 72 and the spiral spring 71 to rotatably support the spring shaft 72.

The shaft supporter 73 can be formed with a shaft accommodating portion 74 to rotatably accommodate the spring shaft 72 therein. Further, a friction member 75 can be provided between the shaft supporter 73 and the spring shaft 72 to generate rotational friction in the spring shaft 72.

The friction member 75 can be inserted in the shaft accommodating portion 74 of the shaft supporter 73 to elastically contact the spring shaft 72. The friction member 75 may comprise a flat spring made of metal to generate rotational friction when the spring shaft 72 is rotated about the shaft supporter 73. However, the friction member 75 may be made of plastics, rubber or the like as well. Preferably, the sum of the rotational friction due to the friction member 75 and the elasticity due to the elastic member 71 is strong enough to prevent the display main body 10 from sliding down due to the weight of the display main body 10. That is, the sum of the rotational friction due to the friction member 75 and the elasticity of the elastic member 71 can be approximately equal to the weight of the display main body 10. Thus, a user can easily lift the display main body 10 with an approximately equal force regardless of an upward or downward direction. Further, the friction member 75 can be employed to compensate for the rotational friction in the spring shaft 72, so that the same elastic member 71 can be used even though various sizes of the display main body 10 are mounted. For example, in the case where the display main body 10 having a size of 17 inches is replaced with the display main body 10 having a size of 19 inches, the friction member 75 can be replaced with another friction member 75 to generate the rotational friction corresponding to a weight difference between the 19-inch and 17-inch display main bodies, without replacing the elastic member 71.

The lifting member 66 can be shaped like a plate, wherein its opposite sides are slidably coupled to the guide frame 61. Further, the lifting member 66 has an upper portion to which the first tilting bracket 31 can be coupled by a screw 64 or the like, and a lower portion formed with the shaft coupling portion 67 to which the spring shaft 72 can be coupled. The lifting member 66 and the guide member 63 may include plastics. That is, the lifting member 66 and the guide member 63 may include a resin, such as acetal, wherein the resin should have a good wear-resistance and a good sliding effect. However, the lifting member 66 and the guide member also 63 may include various other materials as long as the various materials have the good wear-resistance and the good sliding effect. Thus, the lifting member 66 can be slid up and down by the user. The lifting member 66 may comprise a reinforcing member 69 to reinforce its solidity or to reinforce a coupling force with the first tilting bracket 31 or the spring shaft 72. The reinforcing member 69 can be shaped like a plate and made of a metal to have a required solidity. However, the reinforcing member may be made of a nonmetal such as plastics or the like as well. Further, the reinforcing member may not have the plate shape as described above, but may have various shapes such as a bar, etc.

The guide member 63 can be coupled with the guiding portion 61*a* of the guide frame 61, thereby facilitate the guide to slide the lifting member 66. The guide member 63 can be inserted in and coupled to the guiding portion 61*a*, and recessed corresponding to a lateral side of the lifting member 66. The guide member 63 can be provided in the upper portion of the guiding portion 61*a* formed in the guide frame 61 and can be shorter than the lifting member 66. However, the guide member 63 may be provided in the guiding portion 61*a* of the guide frame 61 and have a length corresponding to that of the lifting member 66 so as to support the lifting member 66 to slide up and down.

The oil grooves 68 can be formed transversely to a sliding direction of the lifting member 66 to be in contact with the guide member 63. The oil grooves 68 can be recessed in the opposite sides of the lifting member 66 to accommodate oil. The oil accommodated in the oil grooves 68 is supplied between the guide member 63 and the lifting member 66, to thereby lubricate the slide of the lifting member 66. The oil grooves 68 may be plurally provided.

However, one oil groove 68 may be provided as well. Further, the oil grooves 68 may be provided in the guide member 63 to be in contact with the lifting member 66. Also, the oil grooves 68 may be formed along the sliding direction of the lifting member 66.

The stopper 77 can be coupled to both the guide frame 61 and the lifting member 66 to prevent the lifting member 66 from sliding relative to the guide frame 61. That is, the stopper 77 can be shaped like a pin and inserted into a first stopper coupling portion 79 of the guide frame 61 and a second stopper coupling portion 78 of the lifting member 66. The stopper 77 can be inserted from a back of the guide frame 61 frontward.

The first stopper coupling portion 79 and the second stopper coupling portion 78 can be aligned to communicate with each other in a state in which the lifting member 66 is placed in a lower portion of the guide frame 61. Therefore, the stopper 77 can be inserted into both the first and second stopper coupling portions 79 and 78, so that the lifting member 66 is kept locked in the guide frame 61 even when the display main body 10 is detached from the display apparatus 1 in order to carry the display apparatus 1. Further, the display apparatus 1 can be decreased in volume when packaged.

The lifting restricting part 81 may comprise a sliding slot 83 vertically formed in the guide frame 61, and a sliding projection 85 having a first end coupled to the lifting member 66 and a second end inserted in the sliding slot 83, thereby restricting a slidable distance of the sliding projection 85 within the sliding slot 83.

The sliding slot 83 can be vertically formed on the plate portion 61*b* of the guide frame 61 and has a length corresponding to the slidable distance of the display main body 10. Here, the first end of the sliding projection 85 may be threaded to be screw-coupled to the lifting member 66. However, the sliding slot may be formed on the lifting member, and the sliding projection 85 may be formed on the guide frame.

Figure 7:
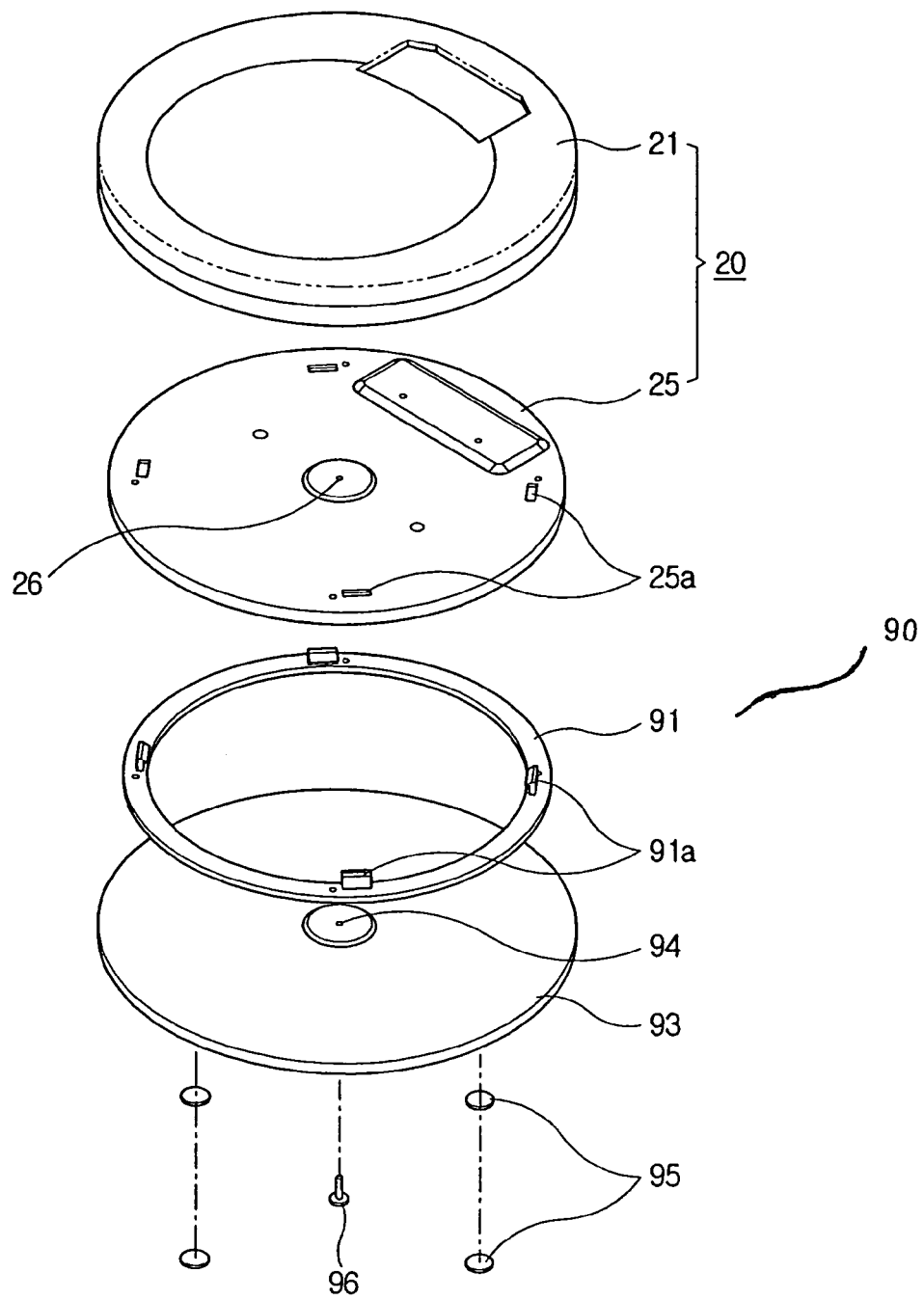
FIG. 7 is an exploded perspective view of a swiveling unit provided in the display apparatus of FIG. 3.

The swiveling unit 90, as shown in FIG. 7, can be provided under the base 20 to swivel the display main body 10 with respect to a vertical direction axis 92 of the display apparatus 1 shown in FIG. 2 relative to the base 20. The swiveling unit 90 may comprise a swiveling member 91 coupled to a bottom of the base 20, and a swiveling supporter 93 having a first side supported on the installation surface and a second side swivelably provided relative to the swiveling member 91 to swivelably support the swiveling member 91.

The swiveling member 91 can have an annular shape to be coupled with the base frame 25 of the base 20. The swiveling member 91 can have an upper surface formed with a hook 91a protruding to couple with a hook holder 25a of the base frame 25, and a lower surface protruding as a semicircular shape to line-contact the swiveling supporter 93. Thus, the swiveling member 91 can be in line-contact with the swiveling supporter 93 and slides, to thereby facilitate the swiveling of the display main body 10.

The swiveling supporter 93 can be shaped like a disc to be seated on the installation surface, such as a table. In the center of the swiveling supporter 93 can be formed a frame coupling portion 94 to be swivelably coupled with the base frame 25. That is, the frame coupling portion 94 of the swiveling supporter 93 can be coupled with a supporter coupling portion 26 of the base frame 25 by a screw 96. Here, the screw 96 can be fastened enough to allow the swiveling supporter 93 to swivel about the base frame 25. The swiveling supporter 93 may be provided with a contact pad 95 on a bottom thereof to prevent noise and sliding when seated on the installation surface. Thus, the display main body 10 coupled with the base 20 can swivel about the swiveling supporter 93.

Operations of the display apparatus 1 with the above configuration will be described with reference to FIGS. 8 through 13.

Figure 8:
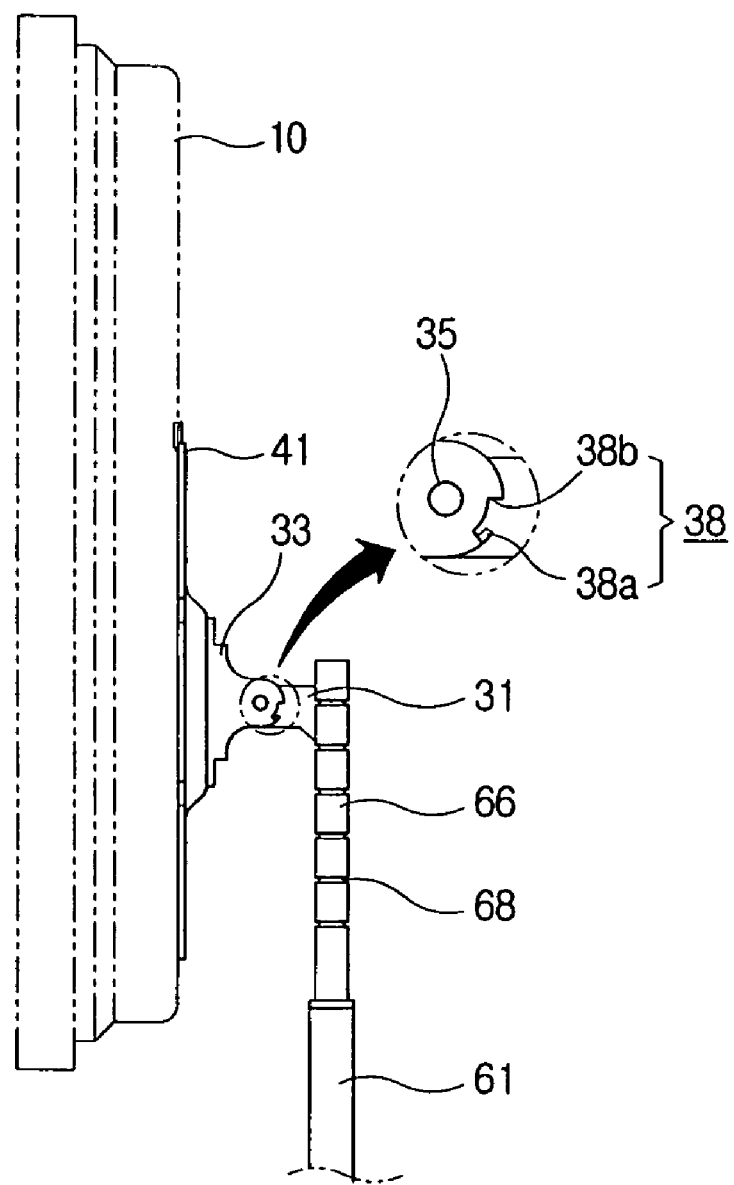
FIGS. 8 through 13 are views of operations of the display apparatus of FIG. 2.
Figure 9:
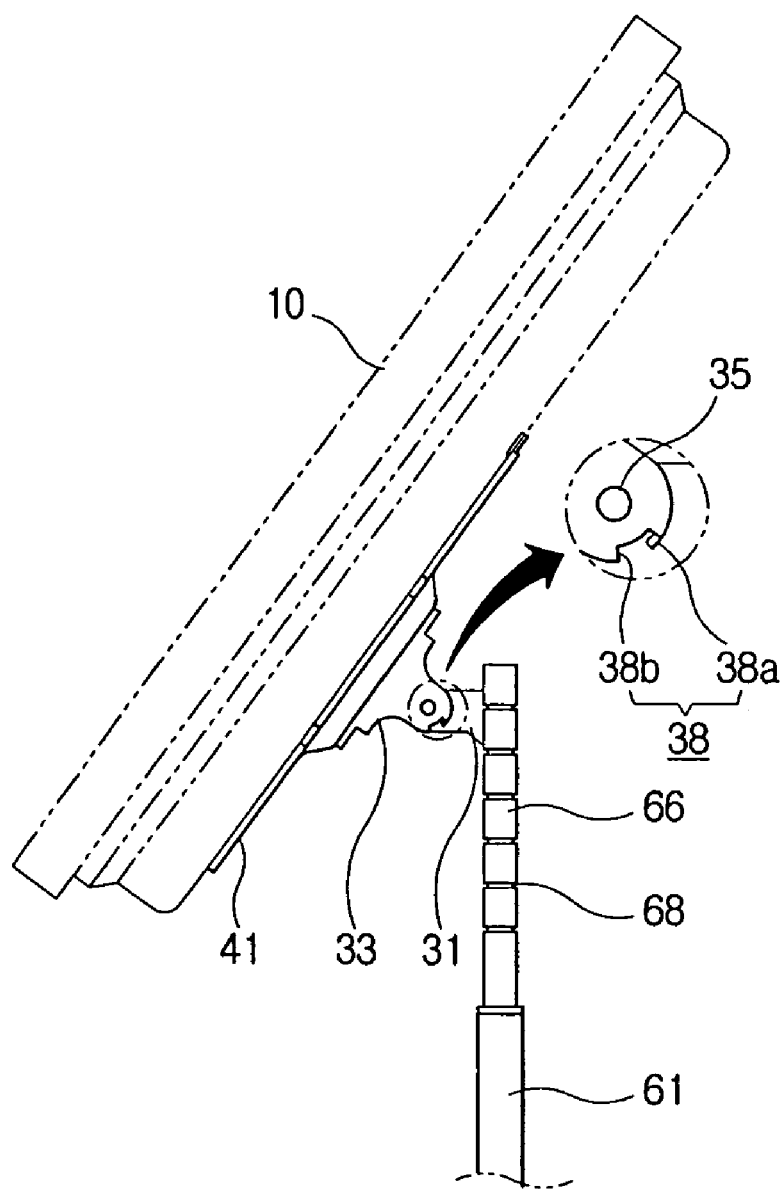

Referring to FIGS. 8 and 9, the display main body 10 can tilt about the base 20 as follows. First, when the user presses the display main body 10 frontward or backward with respect to the right and left direction axis 36 (refer to FIG. 2), the second tilting bracket 33 coupled to the display main body 10 is tilted frontward or backward with respect to the tilting shaft 35 relative to the first tilting bracket 31. Here, the elasticity of the torsion coil spring 37 can allow a user not only to easily tilt the display main body 10 frontward regardless of the weight of the display main body 10, but also to tilt the display main body 10 with an approximately equal force regardless of a frontward or backward direction. Further, the tiltable angle of the display main body 10 can be restricted by the tilting angle restricting part 38.

Figure 10:
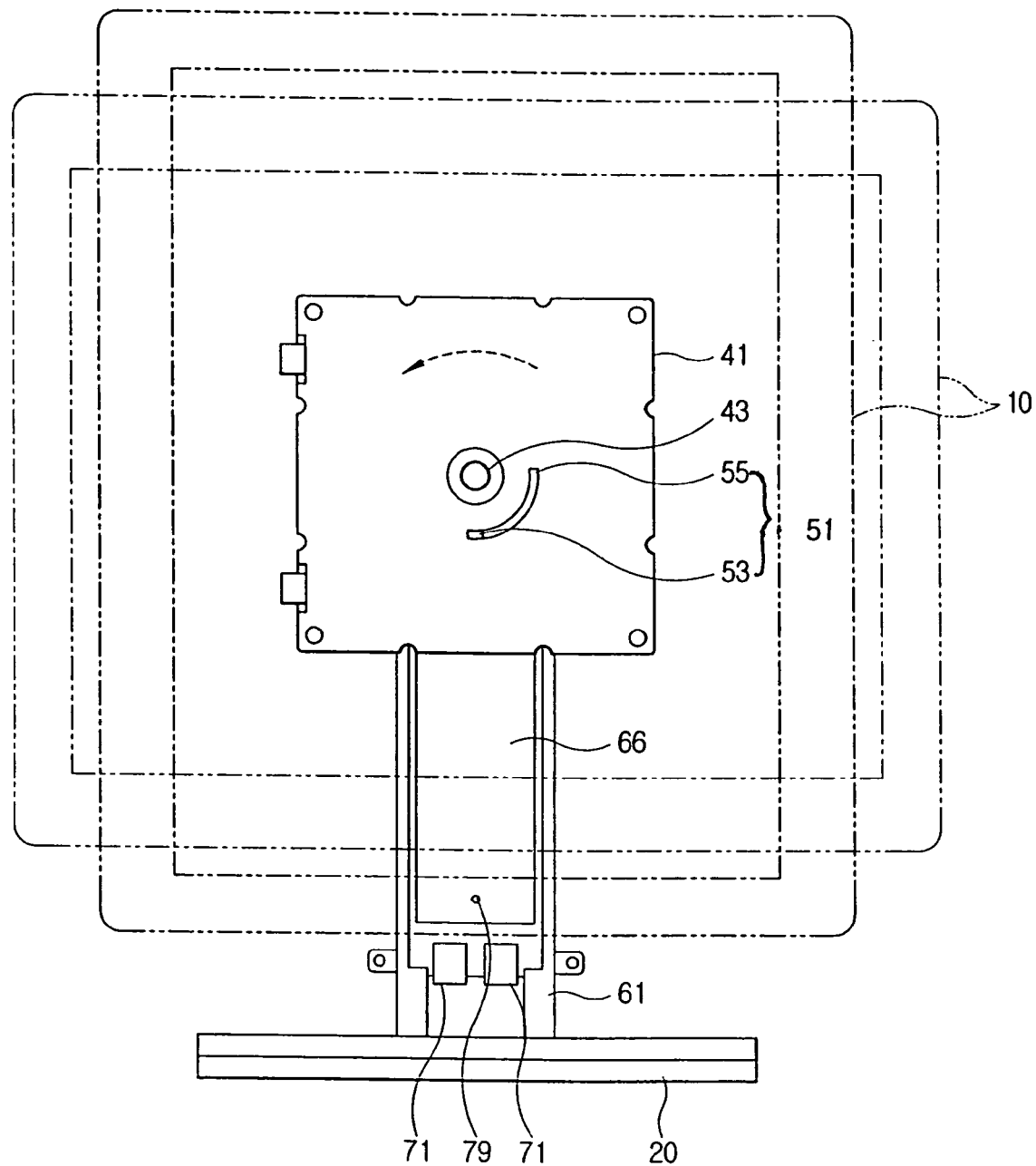
Figure 11:
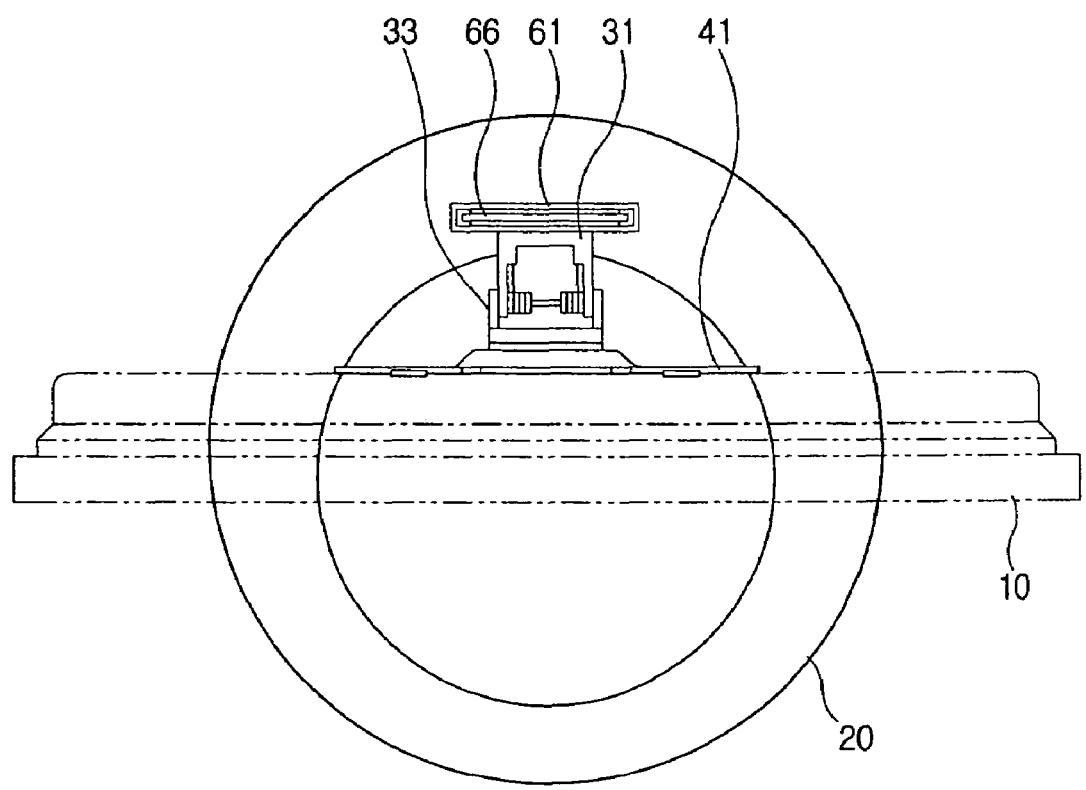

Referring to FIG. 10, the display main body 10 can pivot about the base 20 as follows. First, when the user presses the display main body 10 with respect to the frontward and backward direction axis 44 (refer to FIG. 2), the pivoting bracket 41 coupled to the display main body 10 is pivoted with respect to the pivoting shaft 43 relative to the second tilting bracket 33. Here, the user can press the display main body 10 as much as necessary to overcome the elasticity of the washer 47 (see FIG. 5). Further, the pivotable angle of the display main body 10 can be restricted by the pivoting angle restricting part 51.

Figure 12:
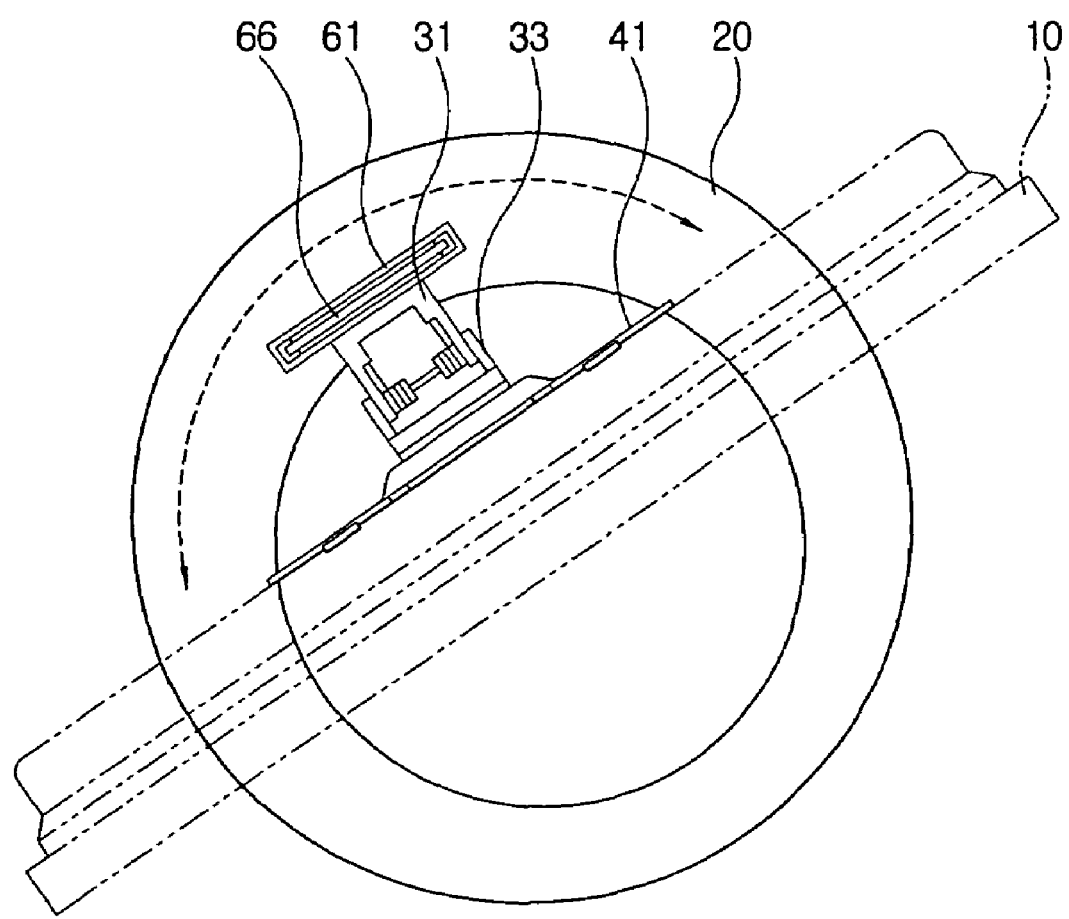

Referring to FIGS. 7 and 12, the display main body 10 can swivel about the installation surface as follows. First, when the user presses the display main body 10 or the base 20 with respect to the vertical direction axis 92 (refer to FIG. 2), the swiveling member 91 coupled to the base 20 swivels about the vertical direction axis 92 relative to the swivel supporter 93 seated on the installation surface.

Figure 13:
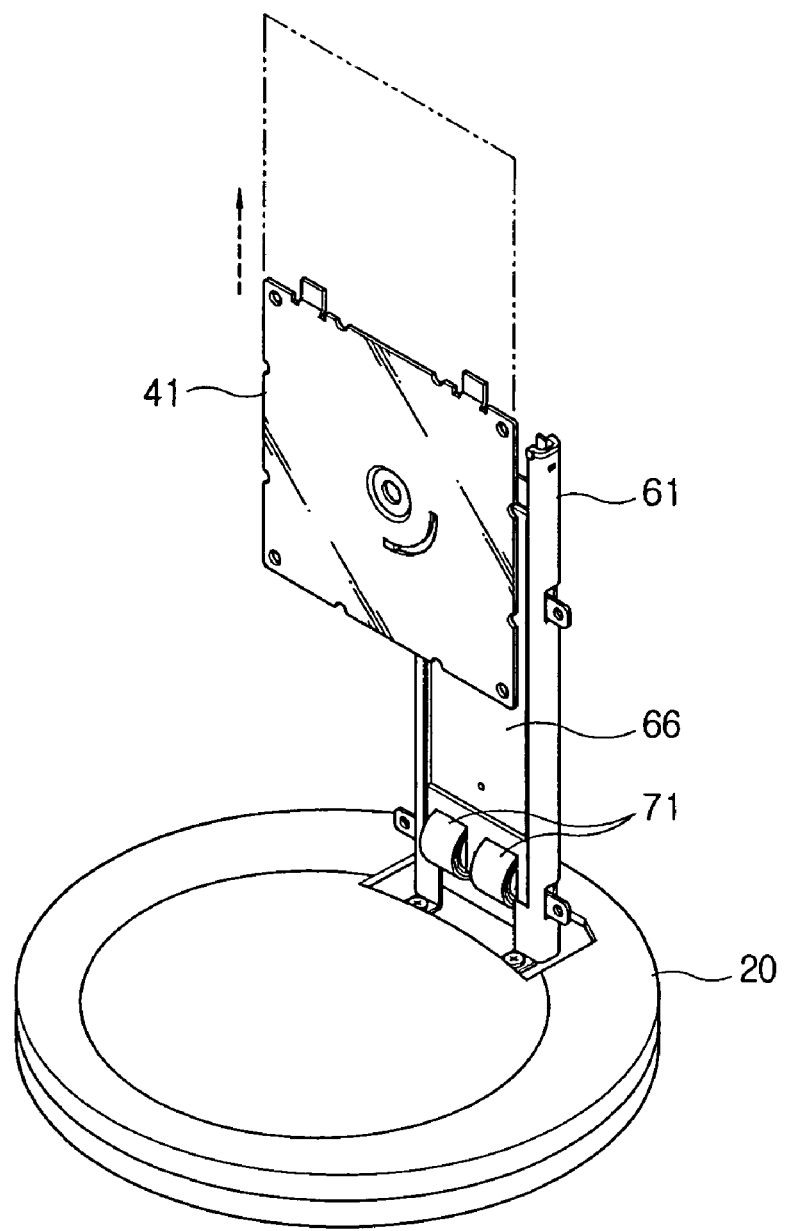
Figure 14:
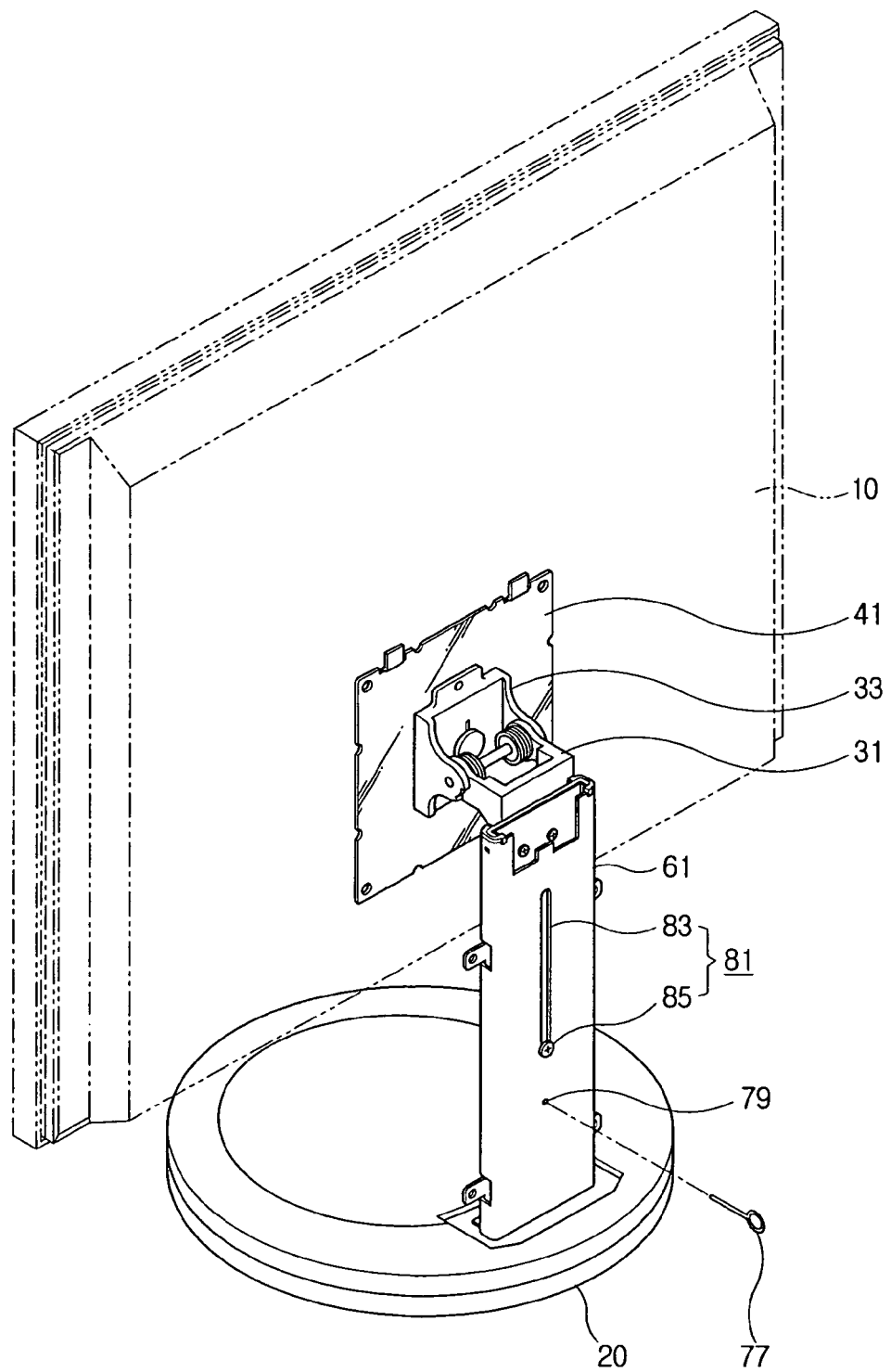
FIG. 14 is a rear perspective view illustrating a stopper being detached from the display apparatus of FIG. 2.

Referring to FIG. 13, the display main body 10 can slide up and down relative to the base 20 as follows. First, when a user presses the display main body 10 upward or downward, the lifting member 66 coupled to the display main body 10 slides up and down relative to the guide frame 61. Here, the elasticity of the elastic member 71 can allow a user not only to lift up the display main body 10 regardless of the weight of the display main body 10 but also to lift the display main body 10 with an approximately equal force regardless of an upward or downward direction.

Thus, in a display apparatus as described above, a lifting unit allows a display main body to be lifted up and down, wherein a lifting member of the lifting unit can be formed with the oil groove, to thereby facilitate the sliding of the lifting member along a guide frame. Further, a friction member allows a rotational friction to be generated in a spring shaft of an elastic member, and the elastic member can be compatibly used even though various sizes of the display main body may be mounted. Further, a stopper allows the display main body to be easily detached from the display apparatus and carried, and allows the display apparatus to be decreased in volume when packaged. Additionally, a tilting unit and a swiveling unit allow the display main body to rotate in various directions relative to the base.

As described above, an embodiment of the present general inventive concept provides a display apparatus in which a display main body can slide up and down relative to a base.

Further, an embodiment of the present general inventive concept provides a display apparatus in which an elastic member is compatibly used even though various sizes of a display main body is mounted thereto.

Still further, an embodiment of the present general inventive concept provides a display apparatus in which a stopper is provided to facilitate detachment and carrying of a display main body and to allow the display apparatus to be decreased in volume when packaged.

Yet further, an embodiment of the present general inventive concept provides a display apparatus in which a tilting unit and a swiveling unit are provided to allow a display main body to rotate in various directions relative to a base.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A display apparatus comprising:
   a display main body to display a picture thereon;
   a base to support the display main body on an installation surface; and
   a lifting unit provided between the display main body and the base to move the display main body up and down relative to the base, the lifting unit comprising:
      a guide frame vertically disposed relative to the base,
      a lifting member slideably provided in the guide frame and coupled to the display main body such that opposite outer edges of the lifting member contact opposite inner edges of the guide frame, and
      at least one oil groove recessed within each of the opposite outer edges of the lifting member to accommodate oil therein.

2. The display apparatus according to claim 1, wherein the lifting unit further comprises a guide member provided in the guide frame to guide the lifting member to slide.

3. The display apparatus according to claim 1, wherein the oil groove is formed transversely to a sliding direction of the lifting member to be in contact with the guide member.

4. The display apparatus according to claim 1, wherein the lifting unit further comprises at least one elastic member provided between the guide frame and the lifting member to elastically bias the lifting member upward relative to the guide frame.

5. The display apparatus according to claim 4, wherein the elastic member comprises a spiral spring having a first end coupled to a plate portion of the guide frame and a second end coupled to a spring shaft, and the lifting member is formed with a shaft coupling portion to which the spring shaft is coupled.

6. The display apparatus according to claim 5, wherein a shaft supporter is provided between the spring shaft and the spiral spring and formed with a shaft accommodating portion to accommodate and rotatably support the spring shaft therein, and
a friction member is provided between the shaft supporter and the spring shaft to generate rotational friction in the spring shaft.

7. The display apparatus according to claim 1, wherein the lifting unit further comprises a stopper to couple the lifting member with the guide frame to allow the lifting member to stop in the guide frame.

8. The display apparatus according to claim 1, wherein the lifting unit further comprises a lifting restricting part to restrict a slideable distance of the lifting member relative to the guide frame.

9. The display apparatus according to claim 8, wherein the lifting restricting part comprises a sliding slot vertically formed in the guide frame, and a sliding projection having a first end coupled to the lifting member and a second end inserted in the sliding slot to restrict a slideable distance of the sliding projection within the sliding slot.

10. The display apparatus according to claim 1, further comprising a tilting unit provided between the display main body and the lifting unit to tilt the display main body about the base.

11. The display apparatus according to claim 10, wherein the tilting unit comprises:
a first tilting bracket coupled to the lifting unit;
a second tilting bracket coupled to the display main body; and
a tilting shaft provided between the first and second tilting brackets to tilt the second tilting bracket about the first tilting bracket.

12. The display apparatus according to claim 11, wherein the tilting unit further comprises a spring coupled to both the first and second tilting brackets.

13. The display apparatus according to claim 10, further comprising a pivoting unit provided between the display main body and the tilting unit to pivot the display main body about the base.

14. The display apparatus according to claim 13, wherein the pivoting unit comprises:
a pivoting shaft coupled to the tilting unit; and
a pivoting bracket having a first side coupled to the display main body and a second side pivotally coupled to the pivoting shaft.

15. The display apparatus according to claim 14, wherein the pivoting unit further comprises a pivoting angle restricting part to restrict a pivotable angle of the pivoting bracket relative to the tilting unit.

16. The display apparatus according to claim 13, further comprising a swiveling unit swivelably coupled to the base to swivel the display main body about the installation surface.

17. The display apparatus according to claim 16, wherein the swiveling unit comprises:
a swiveling member coupled to the base; and
a swiveling supporter having a first side supported on the installation surface and a second side swivelably contacting the swiveling member to support the swiveling member and the base to swivel with respect to each other.

18. The display apparatus according to claim 10, further comprising a swiveling unit swivelably coupled to the base to swivel the display main body about the installation surface.

19. The display apparatus according to claim 18, wherein the swiveling unit comprises:
a swiveling member coupled to the base; and
a swiveling supporter having a first side supported on the installation surface and a second side swivelably contacting the swiveling member to support the swiveling member and the base to swivel with respect to each other.

20. The display apparatus according to claim 1, further comprising a swiveling unit swivelably coupled to the base to swivel the display main body about the installation surface.

21. The display apparatus according to claim 20, wherein the swiveling unit comprises:
a swiveling member coupled to the base; and
a swiveling supporter having a first side supported on the installation surface and a second side swivelably contacting the swiveling member and supporting the swiveling member and the base to swivel with respect to each other.

22. A slide enhancing device to facilitate sliding of a display apparatus, the slide enhancing device comprising:
a moveable member to support the display apparatus including a plurality of grooves recessed within opposite side portions thereof and formed transversely with respect to a sliding direction of the moveable member, the plurality of grooves formed to accommodate oil therein; and
a stationary member to slidably accommodate the moveable member therein, such that the plurality of grooves slide along respective inner sides of the stationary member.

23. The slide enhancing device of claim 22, wherein the display apparatus attaches to the moveable member to slide therewith.

24. The display apparatus according to claim 22, wherein the moveable member comprises plastics.

25. The display apparatus according to claim 1, wherein the lifting member comprises plastics.

* * * * *